United States Patent [19]
Koenig et al.

[11] Patent Number: 5,510,865
[45] Date of Patent: Apr. 23, 1996

[54] CAMERA WITH MID-ROLL REWIND MODE

[75] Inventors: Norbert Koenig, Rochester; Glenn W. Johnson, Webster, both of N.Y.

[73] Assignee: Eastman Kodak Company, Rochester, N.Y.

[21] Appl. No.: 306,749

[22] Filed: Sep. 15, 1994

[51] Int. Cl.$^6$ .................................................. G03B 1/02
[52] U.S. Cl. ........................................ 354/173.1; 354/214
[58] Field of Search ............................... 354/173.1, 212, 354/214, 217, 218, 266

[56] References Cited

U.S. PATENT DOCUMENTS

| | | | |
|---|---|---|---|
| Re. 32,850 | 1/1989 | Araki et al. | 354/412 |
| 4,390,261 | 6/1983 | Yamamoto et al. | 354/173 |
| 4,678,303 | 7/1987 | Desormeaux | 354/173.1 |
| 4,699,487 | 10/1987 | Kawamura et al. | 354/173.1 |
| 4,717,931 | 1/1988 | Himuro et al. | 354/173.1 |
| 4,739,354 | 4/1988 | Kobayashi et al. | 354/173.1 |
| 4,878,075 | 10/1989 | Cannon | 354/173.1 |
| 5,006,873 | 4/1991 | Wash | 354/217 |
| 5,107,290 | 4/1992 | Ohsawa | 354/173.1 |
| 5,398,087 | 3/1995 | Kazami et al. | 354/173.1 |

*Primary Examiner*—A. A. Mathews
*Attorney, Agent, or Firm*—David A. Howley

[57] ABSTRACT

A camera includes a shutter button for commencing a picture taking sequence to record an image on a photographic filmstrip and a mode button for selecting an operating mode of the camera. The mode button is operable to select a mid-roll rewind mode of the camera in which the filmstrip, having one or more unexposed image frames, is wound back into a cartridge in the camera. The mid-roll rewind mode is actuated by the shutter button. Preferably, the shutter button must be operated for a longer period of time to actuate the mid-roll rewind mode than to commence the picture-taking sequence.

5 Claims, 3 Drawing Sheets

CAMERA WITH MID-ROLL REWIND MODE

FIELD OF THE INVENTION

The invention relates generally to the field of photography, and in particular to cameras. More specifically, the invention relates to a camera having a mid-roll rewind mode.

BACKGROUND OF THE INVENTION

Conventional cameras offer a variety of features to photographers. One such feature is a mid-roll rewind feature. When the mid-roll rewind feature is selected, a partially exposed photographic filmstrip in the camera is completely wound back into a film cartridge.

A photographer would use the feature when, for example, there was a partially exposed roll of 100 speed film in a camera left over from daytime outdoor picture taking, and now the photographer desired to take pictures outdoors at night with a higher speed film. After the mid-roll rewind is accomplished, the 100 speed film is removed from the camera and replaced with the higher speed film. Photofinishers typically would not create prints from the unexposed frames on the 100 speed film, thereby saving the photographer from paying for worthless images that would be generated if the photographer were forced to take pictures in order to remove the 100 speed film from the camera.

Prior art cameras with a mid-roll rewind feature included a shutter button for commencing a picture taking sequence and a separate mid-roll rewind button for actuating the mid-roll rewind operation. A problem with such prior art cameras is that a separate button or switch is required to actuate (start) the mid-roll rewind mode. A further problem is that a camera operator may accidentally press the mid-roll rewind button, unintentionally causing the film to be wound back into the cartridge.

U.S. Pat. No. 4,717,931 discloses a fail-safe film prewinder for a camera. The prewinder has a mode switch which can be changed over by switching to a photographing mode upon completion of a prewinding mode in which a film is continuously pulled or prewound from a film cartridge loaded in the camera. When the mode switch is in the prewinding mode position while a shutter release button is being operated, a film transport motor is rotated in the direction to prewind the film again after an interruption of the prewinding mode.

SUMMARY OF THE INVENTION

The present invention is directed to overcoming one or more of the problems set forth above. Briefly summarized, according to one aspect of the present invention, a camera includes means for commencing a picture taking sequence to record an image on a photographic filmstrip and means for selecting an operating mode of the camera. The selecting means is operable to select a mid-roll rewind mode of the camera in which the filmstrip, having one or more unexposed image frames, is wound back into a cartridge in the camera. The mid-roll rewind mode is actuated by the commencing means.

In a preferred embodiment of the invention, the commencing means includes a shutter button, the selecting means includes a mode button, and the shutter button must be operated for a longer period of time to actuate the mid-roll rewind mode than to commence the picture-taking sequence.

By using the commencing means to both commence a picture taking sequence and actuate the mid-roll rewind mode, the number of parts in the camera is reduced. Further, by requiring the shutter button to be operated for a longer period of time to actuate the mid-roll rewind mode than to actuate the picture-taking sequence, accidental actuation of the mid-roll rewind mode is avoided.

These and other aspects, objects, features and advantages of the present invention will be more clearly understood and appreciated from a review of the following detailed description of the preferred embodiments and appended claims, and by reference to the accompanying drawings.

DETAILED DESCRIPTION OF THE INVENTION

Figure 1:
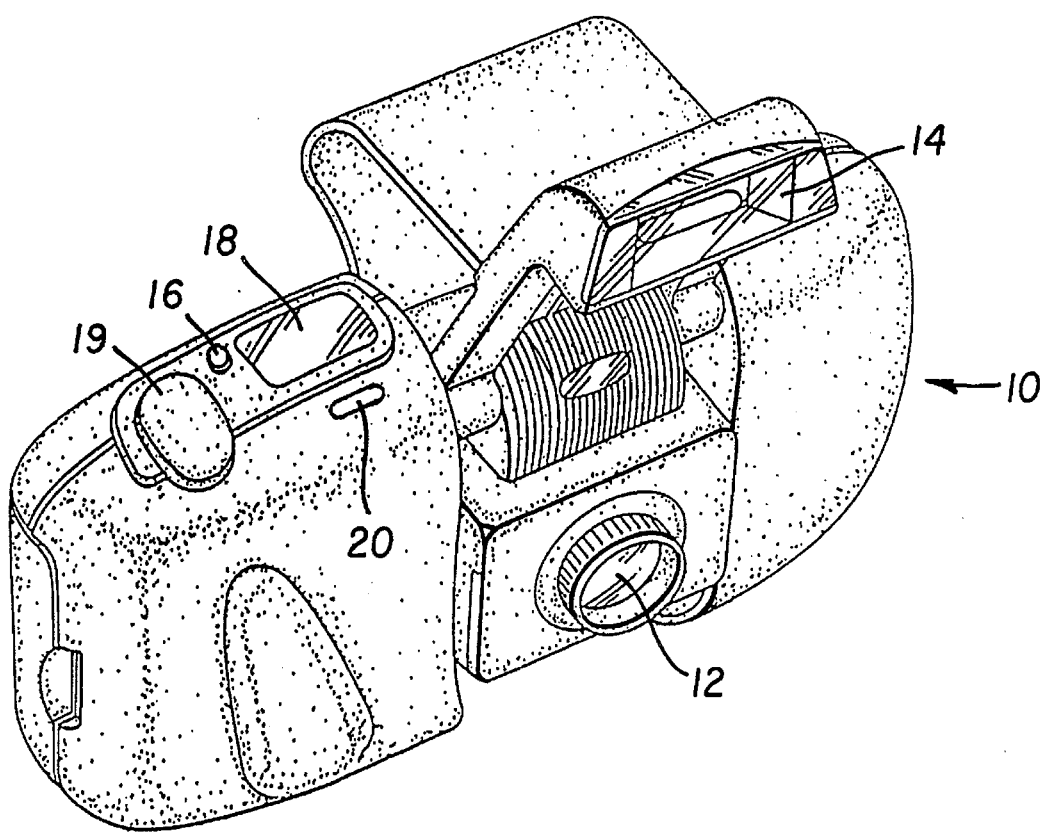
FIG. 1 is a perspective view of a camera incorporating the present invention.

Beginning with FIG. 1, a camera 10 includes an objective lens 12 and a flash 14, both of which are well known to those skilled in the art. Camera 10 is shown in an "on" state in which flash 14 is extended away from lens 12 in order to reduce "red-eye" during flash picture taking. Camera 10 is shut off by rotating the flash downward whereby the flash supporting structure acts as a lens cover over lens 12. An example of such a camera incorporating a flash is the Cameo Motor Camera sold by Eastman Kodak Company.

Camera 10 further includes a mode button 16 which is successively pressed to select various operating modes of the camera. Examples of such modes include normal, fill-flash, self-timer and mid-roll rewind. A liquid crystal display (LCD) 18 displays an arrow that points to a unique icon that is printed on the camera body adjacent the LCD as each mode is selected (no arrow is present in normal mode). The icon informs the camera operator which mode has been selected. LCD 18 is also used to inform the operator how many unexposed film frames remain in the camera.

A shutter button 19 is utilized to commence a picture taking sequence to record an image on a photographic filmstrip in camera 10. As is conventional in the art, picture taking is commenced by momentarily pressing shutter button 19. A light emitting diode (LED) 20 is flashed after the self-timer mode has been selected and the shutter button has been pressed to indicate that the self-timer mode is operating.

Figure 2:
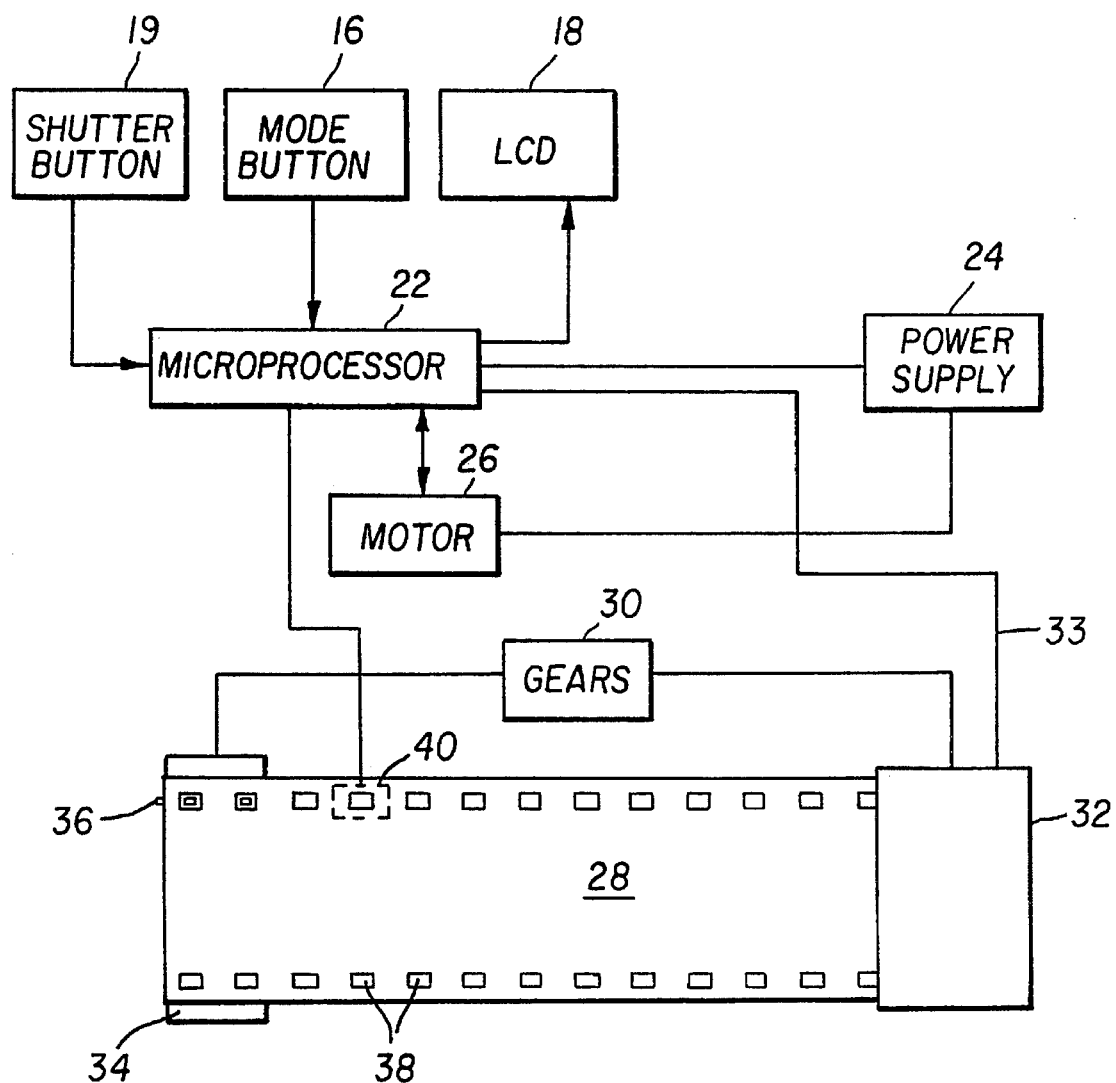
FIG. 2 is a block diagram schematically showing the interrelation of the various parts of the camera of FIG. 1.

Turning now to FIG. 2, shutter button 19 and mode button 16 are connected to and provide input to a camera microprocessor 22. The microprocessor receives electrical power from a power supply 24 which includes one or more batteries. Operation of LCD 18 is controlled by microprocessor 22. An electric motor 26, used to move a photographic filmstrip 28 within the camera via gears 30, is also controlled by microprocessor 22.

The present invention can be incorporated in a prewind type of camera or in a regular wind camera. In such a prewind camera, a film cartridge 32, containing filmstrip 28, is loaded into a chamber within camera 10. Microprocessor 22 is informed that cartridge 32 has been loaded by a DX contact system 33 well known in the art. A leading end of the filmstrip is then engaged with a take-up spool 34 such that teeth 36 on the take-up spool engage perforations 38 in filmstrip 28. A perforation counter 40 informs the microprocessor that the film is moving in the camera and counts film perforations as they pass by. A door covering the chamber is then closed.

In order to prewind the film, the camera operator momentarily presses shutter button 19. Flash 14 can be in either the open or closed position. Microprocessor 22, knowing a new roll of film has been loaded because of inputs over DX contact system 33 and from sensor 40, causes motor 26 to run continuously to rotate spool 34 thereby winding filmstrip 28 onto the spool. Sensor 40 senses the film perforations as they pass by, allowing microprocessor 22 to determine the number of frames on the roll of film (typically, there are eight perforations/frame). The trailing end of filmstrip 28 is secured to a spool within cartridge 32. When the filmstrip is completely wound onto spool 34, perforation counter 40 senses that the film has stopped moving. Microprocessor 22, sensing that film movement has stopped, reverses motor 26 to move the film for eight perforations in the opposite direction to position a first film frame in a picture-taking position. Filmstrip 28 is now prewound. Each time after the camera operator presses shutter button 19 to record an image on the filmstrip, microprocessor 22 causes motor 26 to run such that the filmstrip is wound by one frame back into cartridge 32.

Figure 3:
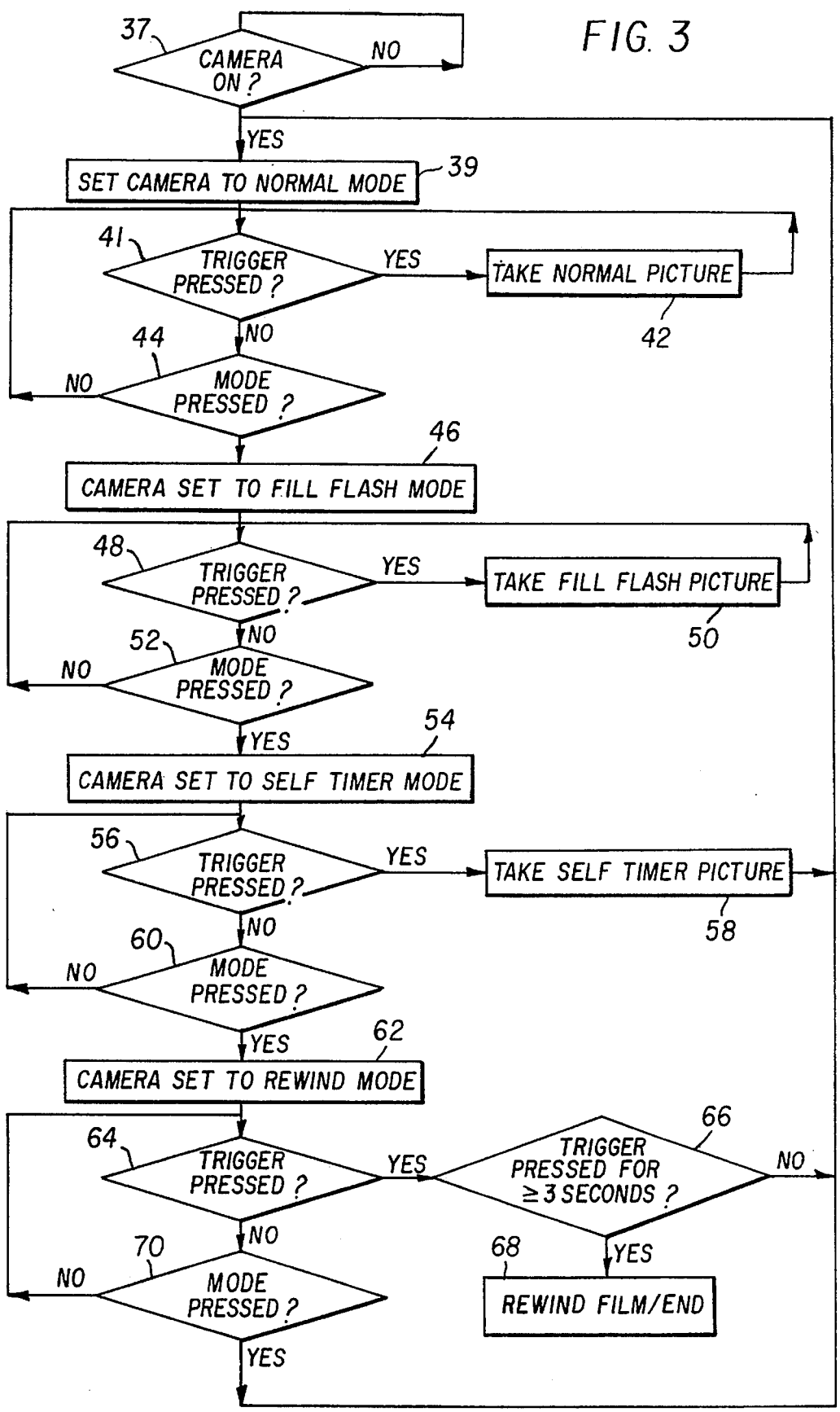
FIG. 3 is a flow diagram representing the operation of the camera of FIG. 1.

Turning now to FIG. 3, the operation of camera 10 after prewind completion will be described. At a step 37, microprocessor 32 determines whether or not camera 10 has been turned on. As described above, camera 10 is turned on when flash 14 is rotated to its open, operating position. Opening the flash operates a switch which informs the microprocessor that the camera has been turned on. Once the camera has been turned on, microprocessor 22 sets the camera to a normal operating mode at a step 39. In the normal mode, a picture will be taken when shutter button 19 is momentarily pressed (e.g. for less than one second) and flash 14 will be fired if scene brightness is below a certain predetermined level.

At a step 41, microprocessor determines whether or not shutter button 19 (trigger) has been pressed. If the trigger has been pressed, a normal picture is taken at a step 42 and the logic flow returns to step 41. If the trigger has not been pressed, the logic proceeds to a step 44 where microprocessor 22 determines whether or not the mode button has been pressed. If the mode button has not been pressed the logic flow returns to step 41. If the mode button has been pressed, microprocessor 22 sets camera 10 to a fill-flash mode at a step 46. In fill-flash mode, flash 14 is fired regardless of scene brightness. At a step 48, microprocessor determines whether or not trigger 19 has been pressed. If trigger 19 has been pressed, microprocessor 22 causes camera 10 to take a fill-flash picture at a step 50 after which the logic returns to step 48.

If trigger 19 has not been pressed, microprocessor determines whether or not mode button 16 has been pressed at a step 52. If the mode button has not been pressed, the logic flow returns to step 48. If the mode button has been pressed, microprocessor 22 sets camera 10 to a self-timer mode at a step 54. In self-timer mode, picture taking is delayed for about ten seconds after trigger 19 is pressed to allow the person pressing the trigger time to get into the scene to be photographed. During the delay, LED 20 is flashed on and off to indicate that the self-timer is operating. At a step 56, microprocessor 22 determines whether or not trigger 19 has been pressed. If trigger 19 has been pressed, microprocessor 22 causes camera 10 to take a self-timer picture at a step 58 after which the logic returns to step 39, resetting the camera to a normal mode.

If trigger 19 has not been pressed, microprocessor 22 determines whether or not mode button 16 has been pressed at a step 60. If the mode button has not been pressed, the logic flow returns to step 56. If the mode button has been pressed, microprocessor 22 sets camera 10 to a mid-roll rewind mode at a step 62. In mid-roll rewind mode, as described above, filmstrip 28 is completely rewound back into cartridge 32 even though there are still one or more unexposed image frames remaining on the filmstrip.

At a step 64, microprocessor 22 determines whether or not trigger 19 has been pressed. If trigger 19 has not been pressed, microprocessor 22 determines whether or not mode button 16 has been pressed at a step 70. If the mode button has not been pressed, the logic flow returns to step 64. If the mode button has been pressed, microprocessor 22 returns the camera to normal mode at step 39. If trigger 19 has been pressed, microprocessor 22 determines whether or not trigger 19 has been pressed for a period of time greater than or equal to about three seconds at a step 66. If trigger 19 has been pressed for a period of time greater than or equal to about three seconds, microprocessor 22 causes camera 10 to actuate the mid-roll rewinding operation at a step 68. After the mid-roll rewinding operation is complete and ended, the camera operator can remove the incompletely exposed film from the camera. If trigger 19 has not been pressed for a period of time greater than or equal to about three seconds, the logic flow returns to step 39, setting the camera to normal mode and aborting the mid-roll rewind mode.

The invention has been described with reference to a preferred embodiment. However, it will be appreciated that variations and modifications can be effected by a person of ordinary skill in the art without departing from the scope of the invention.

PARTS LIST

10 Camera.
12 Objective lens.
14 flash.
16 Mode button.
18 LCD.
19 Shutter button (trigger).
20 Self-timer LED.
22 Microprocessor.
24 Power supply.
26 Electric motor.
28 Photographic filmstrip.
30 Gears.
32 Film Cartridge.
33 DX contact system.
34 Take-up spool.
36 Teeth.
38 Filmstrip perforations.
40 Perforation counter.
37,39,41–70 Logic flow steps.

We claim:

1. A camera comprising means for commencing a picture taking sequence to record an image on a photographic filmstrip and means for selecting an operating mode of the camera, is characterized by:

said selecting means being operable to select a mid-roll rewind mode of said camera in which said filmstrip, having one or more unexposed image frames, is wound back into a cartridge in the camera, said camera also including means for allowing said mid-roll rewind mode to be actuated by said commencing means.

2. The camera of claim 1, wherein said commencing means includes a shutter button.

3. The camera of claim 1, wherein said selecting means includes a mode button.

4. The camera of claim 1, wherein said commencing means must be operated for a longer period of time to actuate said mid-roll rewind mode than to commence said picture-taking sequence.

5. The camera of claim 1, wherein said camera is a prewind type camera.

\* \* \* \* \*